Dec. 20, 1949 — M. B. McKEE — 2,491,824
INDUSTRIAL LIFT TRUCK
Filed Nov. 20, 1944 — 3 Sheets-Sheet 2
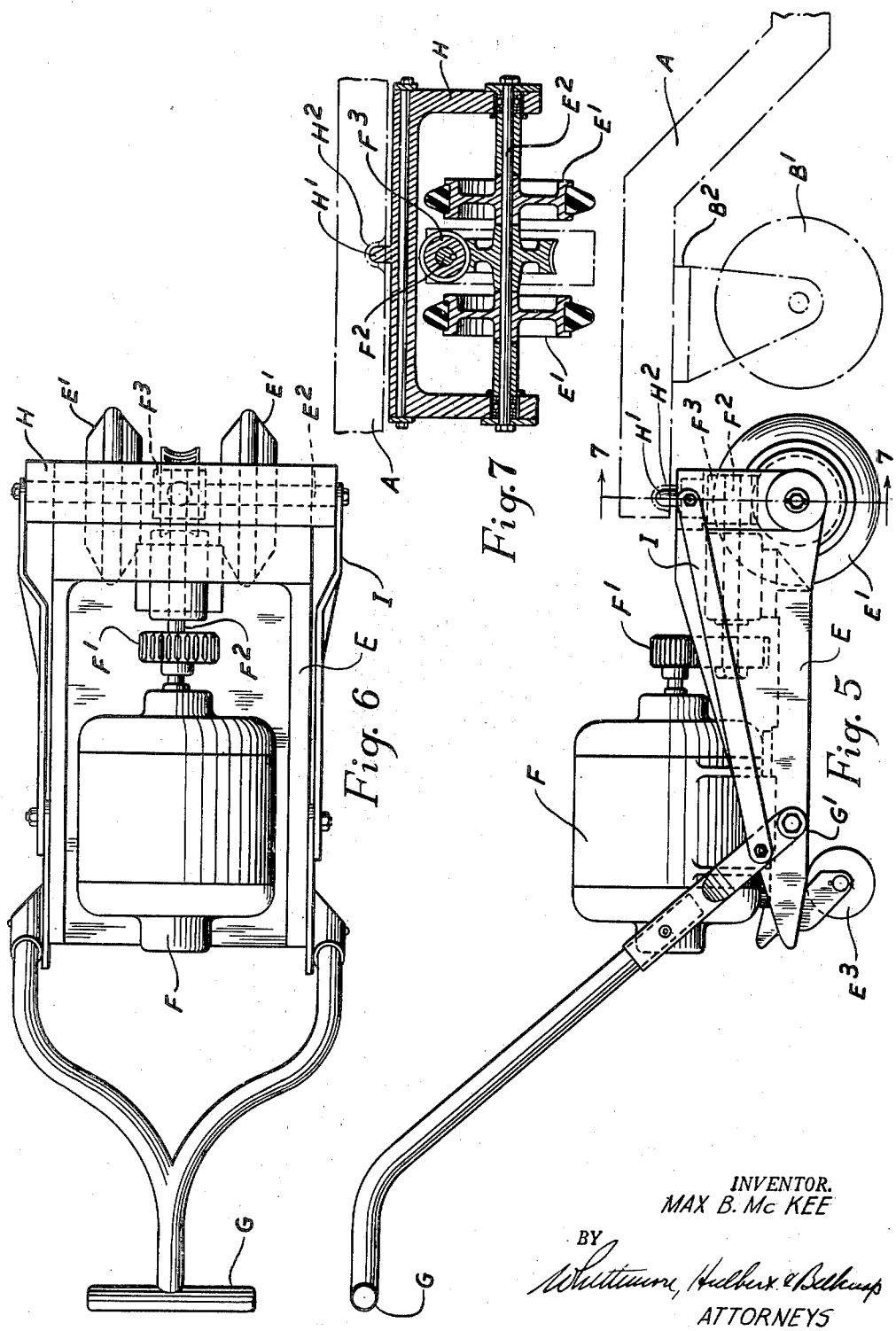
INVENTOR.
MAX B. McKEE
BY
ATTORNEYS Dec. 20, 1949 M. B. McKEE 2,491,824
INDUSTRIAL LIFT TRUCK
Filed Nov. 20, 1944 3 Sheets-Sheet 3

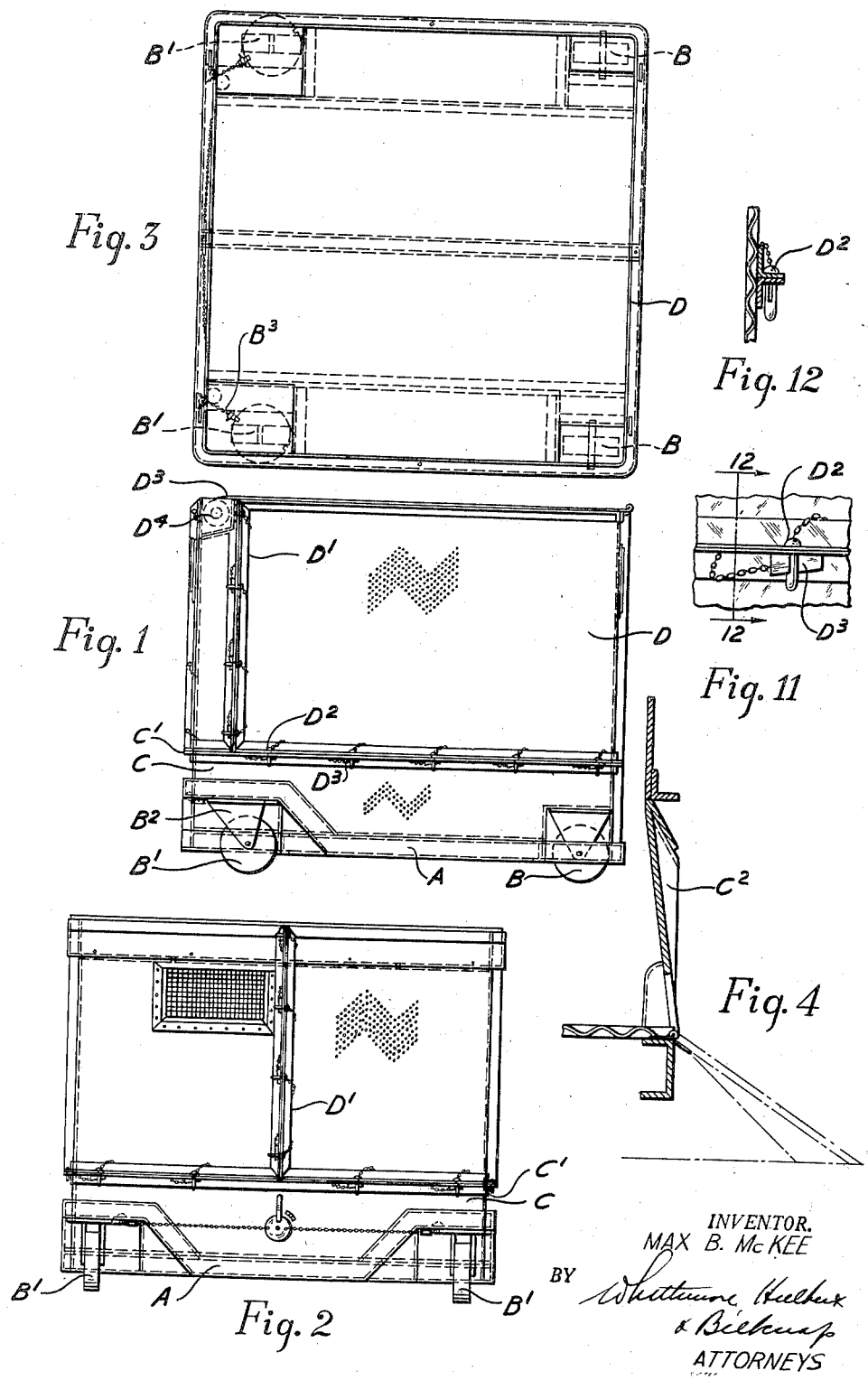

INVENTOR.
MAX B. McKEE
BY
ATTORNEYS

Patented Dec. 20, 1949

2,491,824

UNITED STATES PATENT OFFICE 2,491,824

INDUSTRIAL LIFT TRUCK

Max B. McKee, Detroit, Mich.

Application November 28, 1944, Serial No. 564,386

6 Claims. (Cl. 280—46)

The invention relates to the handling of freight incident to the transportation of the same and more particularly to the loading and unloading of package freight on railway cars and other vehicles of transportation.

It is the object of the invention to provide means for packaging the freight in containers of maximum dimension and further to provide means for speedily and economically handling said containers during the loading and unloading operations. With these objects in view the invention consists, first, in the method; second, in the construction of the container; and, third, in the combination therewith of power actuated handling means. The invention further consists in various features of construction as hereinafter set forth.

In the drawings:

Fig. 1 is a side elevation of the container;

Fig. 2 is an end elevation thereof;

Fig. 3 is a plan view;

Fig. 4 is a section showing the hinged end gate for use in loading the container;

Fig. 5 is a side elevation of the tractor or mule for propelling the container shown in engagement with the latter;

Fig. 6 is a plan view thereof;

Fig. 7 is a section on line 7—7, Fig. 5;

Fig. 11 is an enlarged elevation of the pin and wedge;

Fig. 12 is a cross section on line 12—12, Fig. 11;

General method

The underlying object of the invention is to facilitate handling the freight so as to accomplish the same more expeditiously and with the minimum of labor. This involves, first, the packaging of the freight in containers of maximum dimensions which can be carried on transportation vehicles and readily handled in loading and unloading; second, in providing each container with a wheel base on which it can be rolled; and, third, in providing power propelling means applicable to the containers and by which they may be expeditiously transferred from one vehicle to another. As above described, the instant invention relates to the means and method for loading the container on railway cars or other transportation equipment and also for unloading the same, the construction being as follows:

Wheeled container

Figure 8:
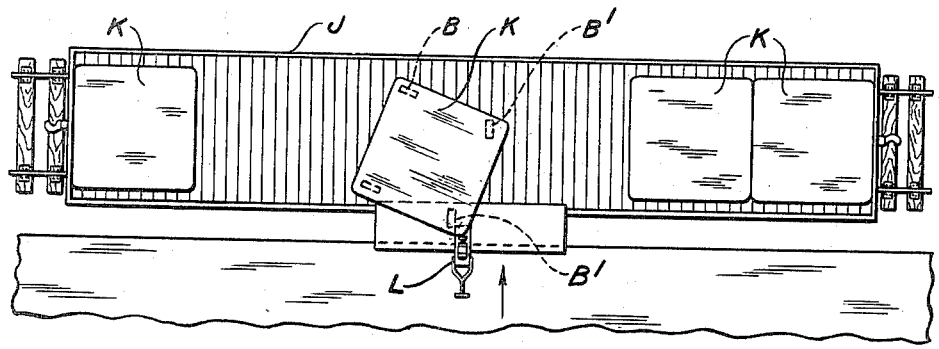
Fig. 8 is a diagrammatic plan view of a railway car illustrating the manner of loading and unloading the same.
Figure 14:
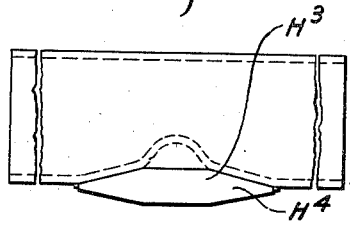
Fig. 14 is an elevation of a portion of the container showing the entrance slot for the coupling pin.
Figure 10:
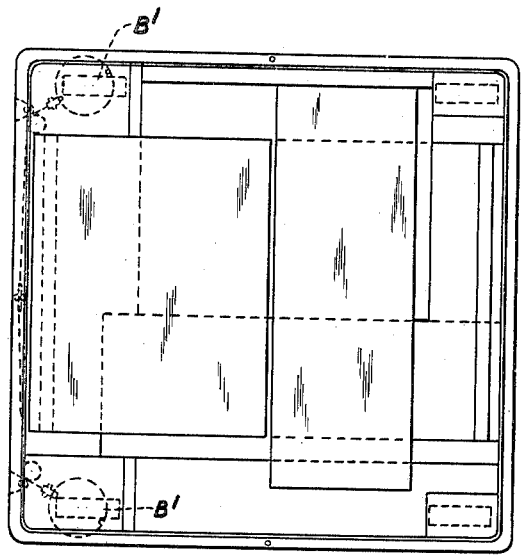
Fig. 10 is a plan view thereof.
Figure 9:
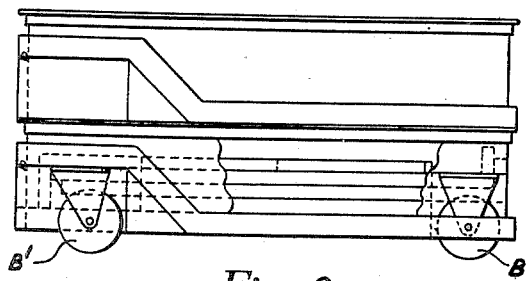
Fig. 9 is a sectional elevation showing a plurality of knockdown containers in stacked relation to each other.

The container used for packaging the freight is preferably a knockdown construction which, after unloading, may be collapsed into a fraction of its original dimensions for return shipment when without load. This container comprises a substantially rectangular base frame A having supporting wheels B and B'. These wheels are located in pockets at the corners of the frame so that the latter is raised only a short distance above the platform. The axes of the wheels B at one end of the container are fixed but the wheels B' have a swivel connection $B^2$ with the frame so as to be capable of turning as a caster. The swivel wheels are capable of being locked, as diagrammatically indicated by $B^3$, to enforce travel in a fixed forward or rearward direction only, thus preventing any distorted movement while rolling or lateral shifting while being transported on ships or vehicles. Above the frame A is a low box structure C and above the latter is a knockdown box structure D. The box C is preferably formed of light weight corrugated sheet metal and is reinforced at its upper end by an angle bar C' surrounding the same. A continuous rugged bumper is formed by the frame around the four exposed sides as protection against violent contact with obstructions which will obtain when containers are in use. The box D is formed in a plurality preferably of light weight sheet metal sections, each reinforced by marginal anchor bars D'. These are secured to each other and to the bars C' of the box C by any suitable, quickly-removable, securing means, such as headed pins $D^2$ passing through registering apertures in the adjacent angle bar flanges and having slotted shanks for receiving wedge members $D^3$. The separate sections of the box D are of such dimensions that when detached they may be stored within the box C as shown in Figs. 9 and 10. To facilitate loading, the box C is provided with a hinged end gate $C^2$ which can be turned down, as indicated in dotted lines, Fig. 4, to form an inclined runway. The box D is preferably provided with a canvas cover $D^5$ which is attached to a spring roll $D^4$ mounted on one of the sections. This cover is adapted to be drawn over the open top of the box D to close the same and is secured by any suitable means to the opposite wall of said box. Such canvas or metal top is provided as a protection against weather damage as well as pilfering of the merchandise contents while in transit. When top is fully unrolled means is provided for sealing same. Thus, the container can be loaded to its full capacity with freight after which it may be rolled on its wheeled base into the railway car or other transportation vehicle.

Power propelling means

Figure 13:
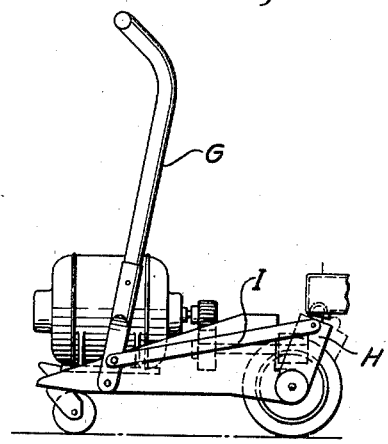
Fig. 13 is a side elevation of the tractor with the handle in forward position.

To furnish power for propelling the container and also to guide the same in its movement, I have provided a tractor or mule of the following construction. E is a frame supported at its forward end on a pair of ground wheels E' mounted on an axle $E^2$ and at its rearward end on a caster wheel $E^3$. On the frame E is mounted an electric motor F connected through intermediate step-down gearing F' with a shaft $F^2$ which latter is connected through a worm gearing $F^3$ with the axle $E^2$. Gasoline motor, storage batteries, or other standard means of supplying power where suitable braking action is provided, may also be used. G is a handle member pivoted at G' to the frame E and extending upward and rearward therefrom. H is an inverted U-shaped frame extending across the frame E and pivotally supported on the axle $E^2$ with clearance over the wheels E' and worm gearing $F^3$. The frame H is connected by links I with the handle member G so that by moving said handle upward and forward, this will swing the frame H forward and downward around the axle $E^2$. Centrally of the frame H is an upwardly extending pivot H' which is adapted to engage a socket $H^2$ on the underside of the frame A. This socket has at its front a flaring entrance slot $H^3$ and at its rear a depending stop flange $H^4$ so that the tractor with its handle in the position shown in Fig. 13 may be easily coupled with the container by passing the pivot pin H' through said entrance slot into contact with said stop. The handle is then moved rearward to swing the frame H upward thereby raising said pin and moving it into said socket. Also the proportion of parts is such that a portion of the load on the adjacent ground wheel B' of the frame A will be removed therefrom and transferred to the ground wheels E'. The dimensions of this propeller unit are small in comparison to those of the frame A of the container and the socket $H^2$ is located at each side of the center of the swivel caster end of said frame A and preferably near the corners thereof. This affords an operator who has hold of the handle G clear forward visibility along one side of the box D in guiding the container where limitation of space is a feature and positive directional control a factor. The motor F has suitable cable connection (not shown) with a source of electrical power and may be controlled by a switch on the handle G, or in some other convenient location. Thus, when the motor is energized, it will drive the wheels E' and, through the pivot H' and socket $H^2$, communicate motion to the frame A. Through the handle G the operator can swing the propeller unit about the pivot H' so as to control the direction of movement imparted to the frame A. Also, as the wheels B' have a swivel connection with the frame A, they will turn to correspond to the direction of movement of the propeller. The mule as described will also supply propelling power where containers are coupled together to form a train when such method of transportation is used.

Operation

The operation of loading a railway car J by the containers, generally designated as K, is as follows: The operator, first, engages the propeller unit, generally designated as L, with the frame A of the container in the manner previously described. He then operates the switch to energize the motor F which propels the container and guides the movement by means of the handle G. As the unit L is at one side of the container K, the operator has clear visibility to guide the movement so as to just clear the same side of the doorway which will insure ample clearance of the opposite side. He can also turn the container within the car to direct it longitudinally thereof to the point of storage. Thus, the containers may be positioned one after the other until all of the space within the car on opposite sides of the doorway have been filled, after which another container may be placed in the center. After positioning is accomplished, the swivel wheels are locked by suitable means, indicated as $B^3$, Fig. 3, to protect against lateral movement while in transit and as containers are placed bumper to bumper in a lengthwise direction a minimum of fastening or bracing is required. In unloading, the direction of rotation of the motor is reversed and the unit L may be used as a tractor for successively drawing the containers K from their stored positions and passing the same outward through the door opening onto the assembly platform or conveying apparatus.

While I have described specifically the loading and unloading of freight cars, it is obvious that the same method and apparatus may be used for loading other vehicles of transportation. After arriving at their final destination, the containers are unpacked and, if there is no return freight to be placed therein, they may be collapsed and stacked, as shown in Figs. 9 and 10, to occupy relatively small space during return shipment.

What I claim as my invention is:

1. A freight-loading apparatus comprising a wheeled carriage having a socket adjacent one corner thereof; a wheeled tractor; and pivotal coupling means engageable in said socket for pivotally coupling said tractor with said carriage to transfer a portion of the weight of the latter to the former, said tractor adapted to propel and guide said carriage, said socket and pivotal coupling means so constructed and arranged that the tractor can swing around the engaged corner of the carriage to maneuver the latter during propulsion of the same.

2. A freight-loading apparatus comprising a wheeled carriage; a wheeled tractor; means on said tractor engageable beneath a corner of said carriage to form a pivotal coupling therewith and to transfer a portion of the wheel load of the former to a wheel of the latter, said pivotal coupling forming the sole support for the engaged corner of the carriage; and a handle on said tractor for manually guiding the same and the carriage propelled thereby.

3. A freight-loading apparatus comprising a wheeled carriage having a downwardly opening socket adjacent one corner thereof; a wheeled tractor; a vertically movable pivot coupling on said tractor engageable in said socket; and means for moving said pivot coupling to elevate the engaged corner of the carriage, said socket and said first coupling so constructed and arranged that the pivot forms the sole support for the raised corner of the carriage.

4. A freight-loading apparatus comprising a wheeled carriage having a downwardly opening socket adjacent one corner thereof; a wheeled tractor; a pivot coupling on said tractor engageable in said socket; a handle on said tractor for manually guiding the same; and means operable by said handle for raising said pivot coupling into said socket and for elevating the adjacent corner of the carriage, whereby to transfer a portion of the wheel load of the carriage to said tractor, said socket and said pivot coupling so constructed and arranged that said pivot forms the sole support for the raised corner of the carriage.

5. A freight-loading apparatus comprising a wheeled carriage having a downwardly opening socket adjacent one corner thereof; a wheeled tractor having a front axle; and a pivot coupling on said axle swingable from a lowered position ahead of the axle to a raised position directly above the axle, said pivot coupling arranged to interengage with said socket when in the lowered position and adapted to raise a corner of the carriage when moved to the raised position, said pivot forming the sole support for the elevated portion of the carriage whereby said tractor can be maneuvered independently of the carriage and moved about said pivot to different sides of the carriage.

6. A freight-loading apparatus comprising a wheeled carriage having a downwardly opening socket adjacent one corner thereof; a wheeled tractor having a front axle; a pivot coupling on said axle swingable from a lowered position ahead of the axle to a raised position directly above the axle, said pivot coupling arranged to interengage with said socket when in the lowered position and adapted to raise a corner of the carriage when moved to the raised position; a pivoted handle on said tractor; and linkage connecting said handle to the pivot coupling for moving the latter between said raised and lowered positions, said pivot forming the sole support for the elevated portion of the carriage whereby said tractor can be maneuvered independently of the carriage and moved about said pivot to different sides of the carriage.

MAX B. McKEE.

REFERENCES CITED

The following references are of record in the file of this patent:

UNITED STATES PATENTS

| Number | Name | Date |
| --- | --- | --- |
| 1,196,723 | Ruckes | Aug. 29, 1916 |
| 1,234,667 | Howe et al. | July 24, 1917 |
| 1,424,788 | Westlake et al. | Aug. 8, 1922 |
| 1,728,839 | Staley | Sept. 17, 1929 |
| 1,966,012 | Koch | July 10, 1934 |
| 2,293,961 | Zimmerman | Aug. 25, 1942 |

FOREIGN PATENTS

| Number | Country | Date |
| --- | --- | --- |
| 475,746 | Great Britain | Nov. 25, 1937 |